June 24, 1952    J. E. ROSE ET AL    2,601,637
POCKET IONIZATION CHAMBER
Filed Dec. 3, 1946
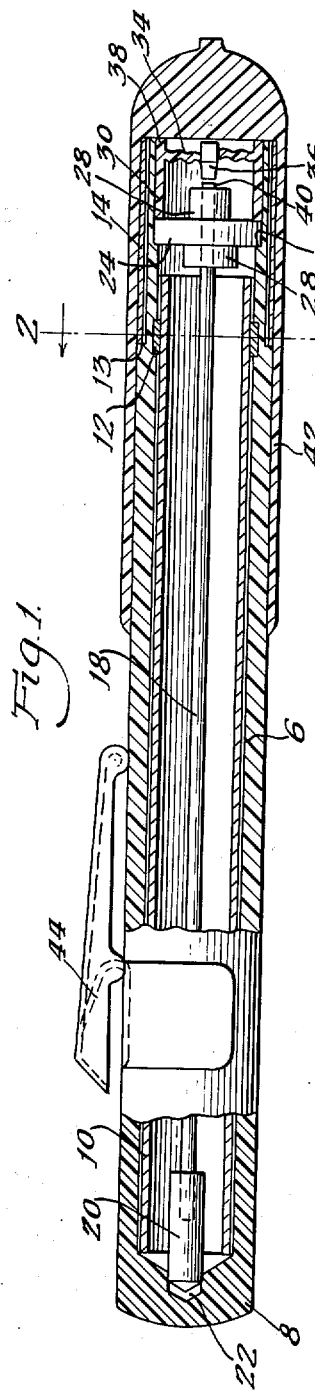
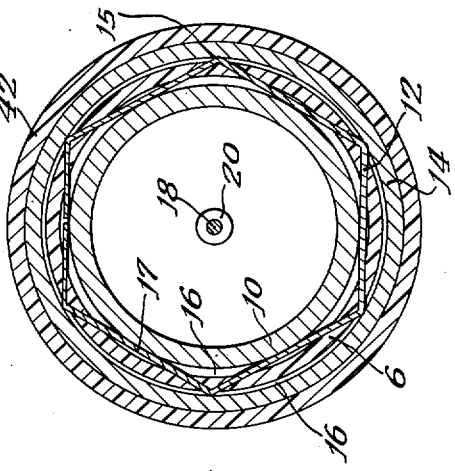
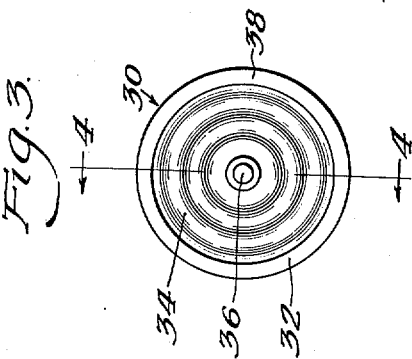
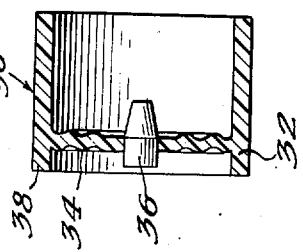
INVENTOR.
John E. Rose
BY Emil W. Hinspater
Robert A. [signature]
Attorney Patented June 24, 1952

2,601,637

UNITED STATES PATENT OFFICE 2,601,637

POCKET IONIZATION CHAMBER

John E. Rose and Emil W. Hinspater, Chicago, Ill., assignors to the United States of America as represented by the United States Atomic Energy Commission Application December 3, 1946, Serial No. 713,654

6 Claims. (Cl. 250—83.6)

1

This invention relates to an improvement in ionization chambers for the measurement of radioactivity.

In the measurement of radioactivity, a device commonly employed is an ionization chamber having two electrodes. As is well known in the art, when ionization occurs between the electrodes, which are maintained at different electrical potentials, the charge of the ions is collected by the electrodes. Thus, by measuring the charge collected by the ionization chamber over a given period of time, the total amount of ionization-producing radioactivity to which the ionization chamber has been exposed during such time may be determined. In laboratories using radioactive substances, it is common to provide workers with pocket ionization chambers which are charged to a standard voltage. The amount of decrease of the voltage over a period of time, for example an eight-hour day, is a measure of the radioactivity to which the wearer has been exposed.

In the past difficulties have been experienced with leakage of charge between the electrodes of such pocket ionization chambers. As is well known, any such leakage causes a decrease in the voltage across the ionization chamber, which decrease simulates the decrease caused by exposure to radioactivity. Thus, by insuring that no leakage occurs the reliability of the measurement is greatly increased.

Accordingly, it is the principal object of this invention to provide an improved ionization chamber adapted to have low leakage and adapted to be readily charged and to have the potential appearing between its electrodes readily measured.

It is a further object of this invention to provide a hermetically sealed ionization chamber having convenient means for conducting charge to the electrodes contained therein.

It is a further object of this invention to provide an improved electrical connector for connecting a cylindrical electrode contained within said hermetically sealed ionization chamber to the exterior.

It is a further object to provide an improved diaphragm device for charging and measuring the chamber whereby the leakage path which exists between the electrodes of the ionization chamber is not exposed to the dust and moisture of the ambient atmosphere.

For an understanding of the invention, reference is made to the drawing, in which:

Fig. 1 is a longitudinal sectional view, partly in elevation, of a pocket ionization chamber embodying the teachings of this invention;

Fig. 2 is a transverse sectional view taken at the line 2—2 of Fig. 1 in the direction indicated by arrows;

Fig. 3 is a view of an insulating diaphragm cap

2 which constitutes a portion of this invention; and

Fig. 4 is a central sectional view of the diaphragm cap illustrated in Fig. 3.

Referring first to Fig. 1, a non-conducting tubular casing, preferably of a non-conducting moldable plastic material such as cellulose acetate butyrate, commonly known as Tenite II, is designated by the numeral 6. The casing 6 is closed at one end thereof as indicated at 8. Within the casing 6 is a conducting tubular outer electrode 10. The outer electrode 10 is preferably of a mixture of graphite with methyl methacrylate resin, sometimes called Lucite.

The outer electrode 10 is held securely in place by a conducting ring 12 in a manner more fully apparent from Fig. 2. The ring 12 is a flat strip of a springy material, such as Phosphor bronze, bent into the shape of a hexagon. The hexagonal ring 12 is co-axial with the casing 6. For optimum operation, it is necessary that the ring 12 afford no opportunity for the leakage of gas between the inner and outer surfaces of the casing 6; therefore, the ring 12 is preferably molded integrally with the casing 6. The casing 6 has on the outer surface of the open end thereof a shoulder portion 13 adapted to receive a conducting collar 14, for example, of aluminum. The vertices 15 of the ring 12 protrude from the outer surface of the casing 6, thus making contact with the conducting collar 14. The sides 17 of the hexagonal ring 12 describes chords across the inner surface of the casing 6 and make contact with the outer electrode 10. It will be seen that slight gaps 16 must be left between the collar 14 and the outer surface of the casing 6, and between the inner surface of the casing 6 and the outer surface of the inner electrode 10 in order to accommodate the vertices 15 and the sides 17. As illustrated in Fig. 2, the gaps 16 are exaggerated for clarity. The ring 12 serves to make electrical contact between the outer electrode 10 and the conducting collar 14 through the casing 6. The casing 6, as will more fully appear below, is sealed so as to be gas tight. The ring 12 may also serve to maintain the position of the outer electrode 10 and the collar 14.

Axially of the casing 6 is a rod-like inner conducting electrode 18, for example of aluminum wire coated with colloidal graphite. The inner electrode 18 is supported at one end by a cylindrical polystyrene insulator 20, the end of the inner electrode 18 being preferably molded into the axis of the insulator. The end portion 8 of the casing 6 has a bore centrally thereof adapted to receive the insulator 20. At the other end of the inner electrode 18 is a disc-shaped polystyrene insulator 24, which rests upon an inner shoulder portion 26 of the casing 6. The polystyrene insulator 24 is likewise preferably molded onto the inner electrode 18. The insulator 24 has shoulder portions 28 on either side thereof to lengthen the leakage path from the periphery of the insulator 24 to the inner electrode 18.

At the end of the casing 6 opposite to the closed end 8 is an insulating diaphragm cap 30 whose construction is more fully illustrated in Figs. 3 and 4. The insulating diaphragm cap 30 is preferably of an insulating-plastic material such as cellulose acetate butyrate, sometimes called Tenite II. It comprises a tubular wall 32 having an axially corrugated diaphragm 34 disposed transversely therebetween and spaced from one end thereof, said diaphragm being adapted to be flexed longitudinally of the cap 30 by pressure at the center of the diaphragm 34. Centrally of the insulating diaphragm 34 is a conducting button 36, preferably of aluminum, extending axially through the diaphragm 34. The insulating diaphragm cap 30 illustrated in Figs. 3 and 4 is preferably molded in a single operation.

Referring again to Fig. 1 the inner edge of the cap 30 rests against the outer surface of the polystyrene insulator 24. The lip portion 38 of the insulating cap 30, formed by the above-mentioned spacing of the diaphragm 34 from the outer end of the cap 30, is co-terminous with the end of the casing 6. The lip portion 38 is sealed to the end of the casing 6, preferably by the application of heat or of a solvent causing the flowing together of the plastic lip portion 38 and the end of the casing 6. The presence of the lip portion 38 enables the sealing operation to be preformed without the risk of damaging the diaphragm 34.

It will be seen that the structure illustrated provides a gas-tight enclosure for the electrodes 10 and 18 of the ionization chamber. In the normal position of the diaphragm 34, the conducting button 36 is spaced slightly from the end 40 of the inner electrode 18; however, the diaphragm 34 may be flexed by application of an external force to the conducting button 36, thus causing contact between the conducting button 36 and the electrode 18. It will be seen that when the diaphragm 34 is at its normal position there exists no leakage path between the inner electrode 18 and the outer electrode 10 which is at any time exposed to the action of the ambient atmosphere. Thus, no moisture or dust may be deposited on the surface of the insulators which separate these two electrodes. Obviously, the assembly and sealing should be done in a dry and clean atmosphere as, for instance, in an air-conditioned room. The filling of the chamber may be air or another suitable gas at a pressure equal to or greater than atmospheric. A protective cap 42 and a pocket clip 44 of the type commonly used on fountain pens complete the assembly.

In using the embodiment of the invention illustrated in Fig. 1, the protective cap 42 is removed, for example at the commencement of a working day, and an electrical potential is applied between the conducting button 36 and the conducting collar 14, the conducting button 36 being simultaneously pressed to make contact with the inner electrode 18. The ionization chamber is thus charged to a desired potential. The pressure on the conducting button 36 is then released and the protective cap 42 is replaced. The chamber may then be worn by a worker for a long period of time, for example eight hours, without any appreciable leakage of the charge which has thus been placed upon the electrodes 10 and 18. After the period during which the exposure to radiation is sought to be measured, the protective cap 42 is removed and a voltage-measuring instrument such as an electrometer is applied to the conducting collar 14 and the conducting button 36, pressure again being applied to the conducting button 36 to make contact with the inner electrode 18. The decrease in voltage between the time of charging and the time of measurement may then be interpreted by methods well known in the art to give the amount of radiation to which the chamber, and thus the wearer, have been exposed during period since charging.

It will be readily understood that the teachings of this invention are not limited to the specific embodiment illustrated in the drawing and described above. Persons skilled in the art will readily devise equivalent embodiments utilizing the teachings of the invention.

What is claimed is:

1. An ionization chamber comprising, in combination, a substantially tubular hermetically sealed electrically insulating casing, a substantially tubular outer conducting electrode disposed within and co-axial with said casing, a cylindrical contact element mounted on and coaxial with the exterior surface of the casing, a rod-like inner conducting electrode within and axial of said casing, pressure-tight means for making electrical contact between each of said electrodes and the exterior of said casing, said means connecting the contact element with the outer electrode, and including a flexible insulating diaphragm having a conducting pin extending centrally therethrough mounted contiguous to the one end of the inner electrode, said conducting pin contacting said inner electrode only by distension of the diaphragm, and a gaseous ionizing medium within said casing.

2. An ionization chamber comprising, in combination, a substantially tubular hermetically sealed electrically insulating casing, a substantially tubular outer conducting electrode disposed within and co-axial with said casing, a rod-like inner conducting electrode disposed axially of said casing and said outer electrode, a substantially tubular electrically conducting contact ring sleeved co-axially over said casing, a substantially equilateral polygonal electrically conducting ring co-axial with said casing and having vertices protruding from said casing, said sides being in contact with said outer electrode and said vertices being in contact with said contact ring, said casing having at one end thereof an electrically insulating diaphragm having centrally thereof an electrically conducting portion extending through said diaphragm, said conducting portion being normally spaced from the end of the inner electrode within said casing, and said diaphragm being adapted to make contact between said central portion and the inner electrode by distension of the diaphragm.

3. An ionization chamber comprising, in combination, a substantially tubular hermetically sealed electrically insulating casing, a substantially tubular outer conducting electrode coaxially disposed within the casing, a rod-like inner electrode within the casing and axially mounted in insulated spaced apart relationship with the outer electrode, and terminal means for connecting the electrodes including a cylindrical contact element coaxially attached to the exterior surface of one end of the casing, a connecting member electrically connected to the contact element and to the outer electrode, and a terminal contact for the inner electrode centrally mounted on the end of the casing contiguous to the contact element.

4. An ionization chamber comprising the elements of claim 3, and a cap member snugly fitted over the contact member and the adjacent end of the casing.

5. An ionization chamber comprising, in combination, a hermetically sealed electrically insulating casing, an outer conducting electrode disposed within and adjacent to said casing, an inner electrode disposed within the outer electrode, an insulating charging pin supported upon the outer casing by resilient means which normally holds said pin out of contact with said center electrode but which permits said pin to be moved into temporary contact with the center electrode during charging of the chamber, and means connecting the outer electrode to the exterior of the casing, said means comprising an electrically conducting element mounted on the exterior of the casing and an electrically conducting element extending through the casing from the outer electrode to the contacting element.

6. An ionization chamber comprising, in combination, a hermetically sealed electrically insulating casing, an outer electrode disposed within said casing and contiguous thereto, an inner electrode disposed within the outer electrode, gastight contact means mounted on the casing adjacent to the inner electrode and adapted to contact the inner electrode during charging periods, a contact ring disposed upon the outer surface of the outer electrode, and a substantially equilateral polygonal electrically conducting ring coaxial with said casing and having vertices protruding from said casing, said sides being in contact with the outer electrode and said vertices being in contact with the contact ring.

JOHN E. ROSE.
EMIL W. HINSPATER.

REFERENCES CITED

The following references are of record in the file of this patent:

UNITED STATES PATENTS

| Number | Name | Date |
| --- | --- | --- |
| 1,855,669 | Glasser et al. | Apr. 26, 1932 |
| 1,873,042 | Rohrdanz | Aug. 23, 1932 |
| 1,933,063 | Kolhorster | Oct. 31, 1933 |
| 2,022,117 | Lauritsen | Nov. 26, 1935 |
| 2,121,180 | Vatter | June 21, 1938 |
| 2,219,273 | Scherbatskoy | Oct. 22, 1940 |
| 2,317,023 | Bird | Apr. 20, 1943 |
| 2,536,991 | Wollan et al. | Jan. 2, 1951 |
| 2,545,386 | Rich | Mar. 13, 1951 |